(12) United States Patent
Min et al.

(10) Patent No.: US 6,311,249 B1
(45) Date of Patent: *Oct. 30, 2001

(54) BUS ARBITRATION SYSTEM HAVING BOTH ROUND ROBIN AND DAISY CHAIN ARBITERS

(75) Inventors: Kyung Pa Min; Gye Hun Lee, both of Seoul (KR)

(73) Assignee: Hyundai Electronics Industries Co., Ltd., Kyoungki-do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 3 days.

(21) Appl. No.: 09/031,200

(22) Filed: Feb. 26, 1998

(30) Foreign Application Priority Data

Mar. 12, 1997 (KR) .................................... 97 8324

(51) Int. Cl.[7] ........................................................ G06F 13/00
(52) U.S. Cl. ........................ 710/711; 710/120; 710/241
(58) Field of Search .................. 710/110–111, 113–116, 710/119–123, 241–243, 244, 40, 43

(56) References Cited

U.S. PATENT DOCUMENTS

| | | | |
|---|---|---|---|
| 4,314,335 | * | 2/1982 | Pezzi ..................... 710/243 |
| 4,641,266 | * | 2/1987 | Walsh ................... 710/110 |
| 5,088,024 | * | 2/1992 | Vernon et al. ......... 710/110 |
| 5,499,345 | * | 3/1996 | Watanabe ............. 710/117 |
| 5,519,837 | | 5/1996 | Tran . |
| 5,581,782 | * | 12/1996 | Sarangdhar et al. ... 709/201 |
| 5,583,999 | * | 12/1996 | Sato et al. ............ 710/243 |
| 5,729,702 | * | 3/1998 | Creedon et al. ...... 710/111 |
| 5,832,278 | * | 11/1998 | Pham .................... 710/243 |

* cited by examiner

Primary Examiner—Robert Beausoleil
Assistant Examiner—Raymond N Phan

(57) ABSTRACT

A bus arbitration system includes a first priority grant signal determination part for primarily determining a priority grant signal among two groups including a plurality of priority request signals, and a second priority grant signal determination part for finally outputting the priority grant signal among the priority request signals enabled by the first priority grant signal determined from the first priority grant signal determination part. Such a bus arbitration system adopts both the daisy-chain arbitration mode and the round-robin arbitration mode organically. This allows the devices of different characteristics to use the bus line to be suitable for their characteristics, thereby improving throughput of the bus arbitration.

21 Claims, 5 Drawing Sheets

BUS ARBITRATION SYSTEM HAVING BOTH ROUND ROBIN AND DAISY CHAIN ARBITERS

BACKGROUND OF THE INVENTION

1. Field of the Invention

The present invention relates to computer systems, and more particularly, to a bus arbitration system suitable a variety of input and output devices of different characteristics.

2. Discussion of the Related Art

A conventional bus arbitration system will be described with reference to the accompanying drawings.

FIG. 1 shows a conventional bus arbitration system according to daisy-chain mode.

As illustrated in FIG. 1, the conventional bus arbitration system according to daisy-chain mode includes a plurality of arbiters connected to one another in series with a sequential priority order, and a bus busy line connected to the respective arbiters.

Output terminals PO of the respective arbiters are respectively connected to input terminals PI of their successive arbiters. The respective arbiters are connected to a bus line.

Such a bus arbitration system allows the respective arbiters to use the bus line sequentially. In other words, the bus arbitration system allows a first arbiter to use the bus line firstly and also allows the last arbiter to use the same lastly. The bus arbitration system allows the arbiter at the next level to use the bus line if the first arbiter does not request to use the same.

In this respect, if any one of a plurality of the arbiters has an input value "1" and does not request to use the bus line (that is, if it does not request interrupt), it has an output value "1". The output value "1" is transferred to the input terminal of the successive arbiter.

Meanwhile, if any one of a plurality of the arbiters has an input value "1" and requests to use the bus line, it has an output value "0" and has the priority capable of using the bus line. Then, the arbiter recognizes the bus busy line. If the other device uses the bus line, the arbiter uses the bus line after the other device completed its use. If the other device does not use the bus line, the arbiter can directly use the same.

At this time, the arbiter which once had the priority has the last priority order.

Other conventional bus arbitration system which adopts round-robin mode will be described with reference to FIG. 2.

Referring to FIG. 2, a plurality of priority request signals (request signals for use of a bus line) are separately input to a first logic gate 21 and a second logic gate 22. The priority request signals passed through the first and second logic gates 21 and 22 are connected to a first round-robin arbiter 23. Here, the priority request signals from the first logic gate 21 are separately input to third and fourth logic gates 24 and 25, and the priority request signals from the second logic gate 22 are separately input to fifth and sixth logic gates 26 and 27.

Output signals of the third and fourth logic gates 24 and 25 are connected to a second round-robin arbiter 28, and output signals of the fifth and sixth logic gates 26 and 27 are connected to a third round-robin arbiter 29. At this time, output signals of the third round-robin arbiter 29 act as enable signals of the second and third round-robin arbiters 28 and 29.

The priority is determined by a first level corresponding to the first round-robin arbiter 23 and a second level corresponding to the second and third round-robin arbiters 28 and 29. The priority of the second level is determined as below.

Two adjacent request signals of a plurality of the priority request signals are respectively input to fourth, fifth, sixth and seventh round-robin arbiters 30, 30a, 30b and 30c.

The fourth, fifth, sixth and seventh round-robin arbiters 30, 30a, 30b and 30c at the last level are half of the input priority request signals. The fourth, fifth, sixth and seventh round-robin arbiters 30, 30a, 30b and 30c selectively output a final priority request signal.

Such a bus arbitration system of round-robin mode evenly gives the respective devices the priority.

The conventional bus arbitration systems as aforementioned have several problems.

A plurality of the devices connected to the bus line have different characteristics. For example, any one of a plurality of the devices tends to use the bus line frequently or urgently as compared to the other devices. In this case, it is difficult for the respective devices to use the bus line to be suitable for their characteristics because the priority is evenly given to all of the devices.

SUMMARY OF THE INVENTION

Accordingly, the present invention is directed to a bus arbitration system that substantially obviates one or more of the problems due to limitations and disadvantages of the related art.

An object of the present invention is to provide a bus arbitration system which improves throughput of bus arbitration by giving a variety of devices the priority suitable for their characteristics.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a bus arbitration system according to the present invention includes a first priority grant signal determination part for primarily determining a priority grant signal among two groups including a plurality of priority request signals, and a second priority grant signal determination part for finally outputting the priority grant signal among the priority request signals enabled by the first priority grant signal determined from the first priority grant signal determination part. Here, the first and second priority grant signal determination parts include both round-robin arbiter and a daisy-chain arbiter organically.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
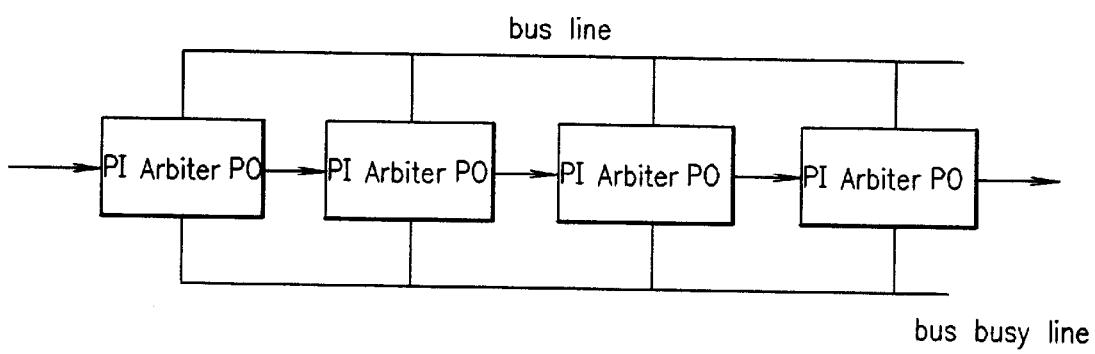
FIG. 1 is a schematic block of a conventional bus arbitration system according to daisy-chain mode.
Figure 2:
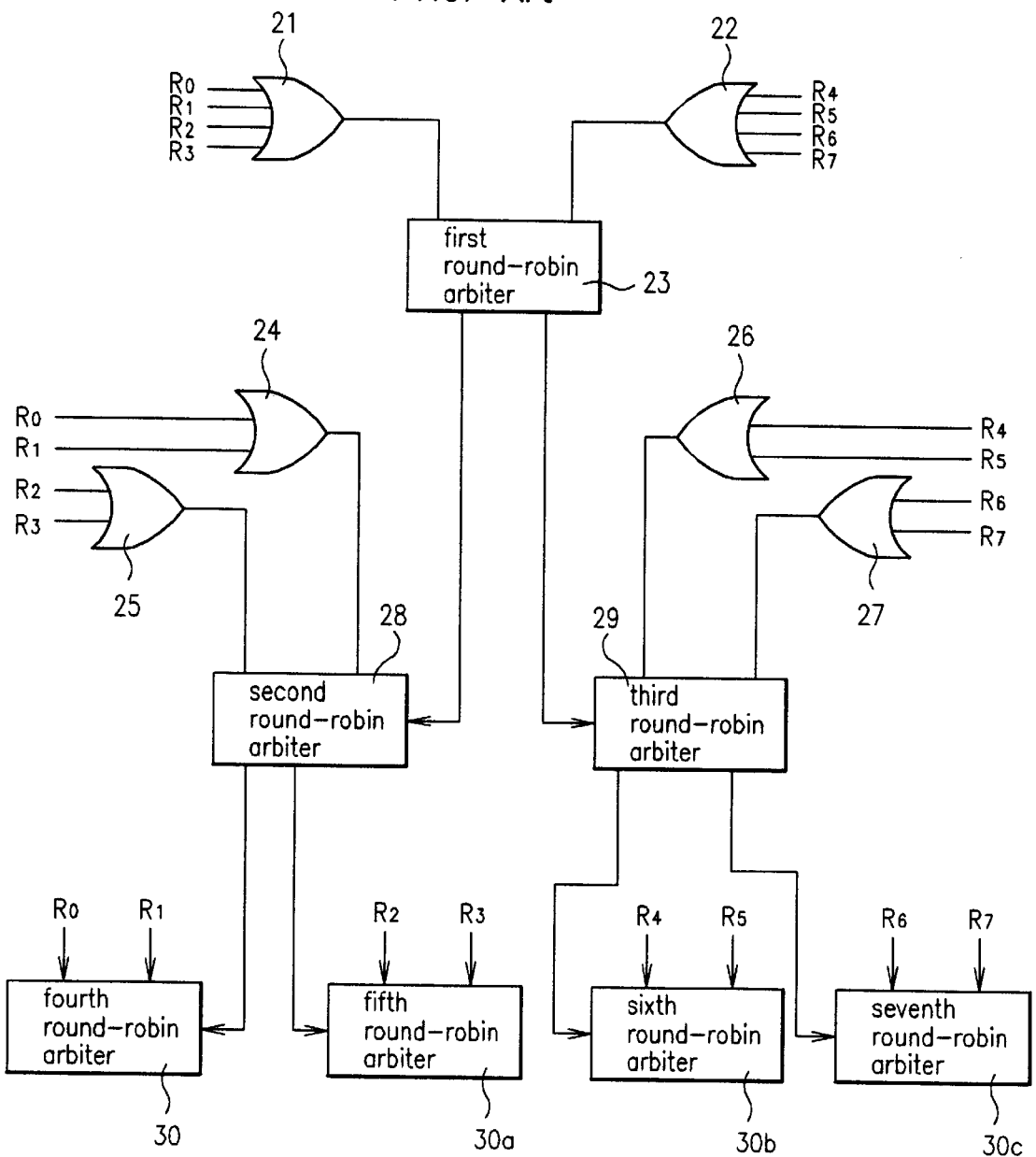
FIG. 2 is a schematic block of a conventional bus arbitration system according to round-robin mode.
Figure 3:
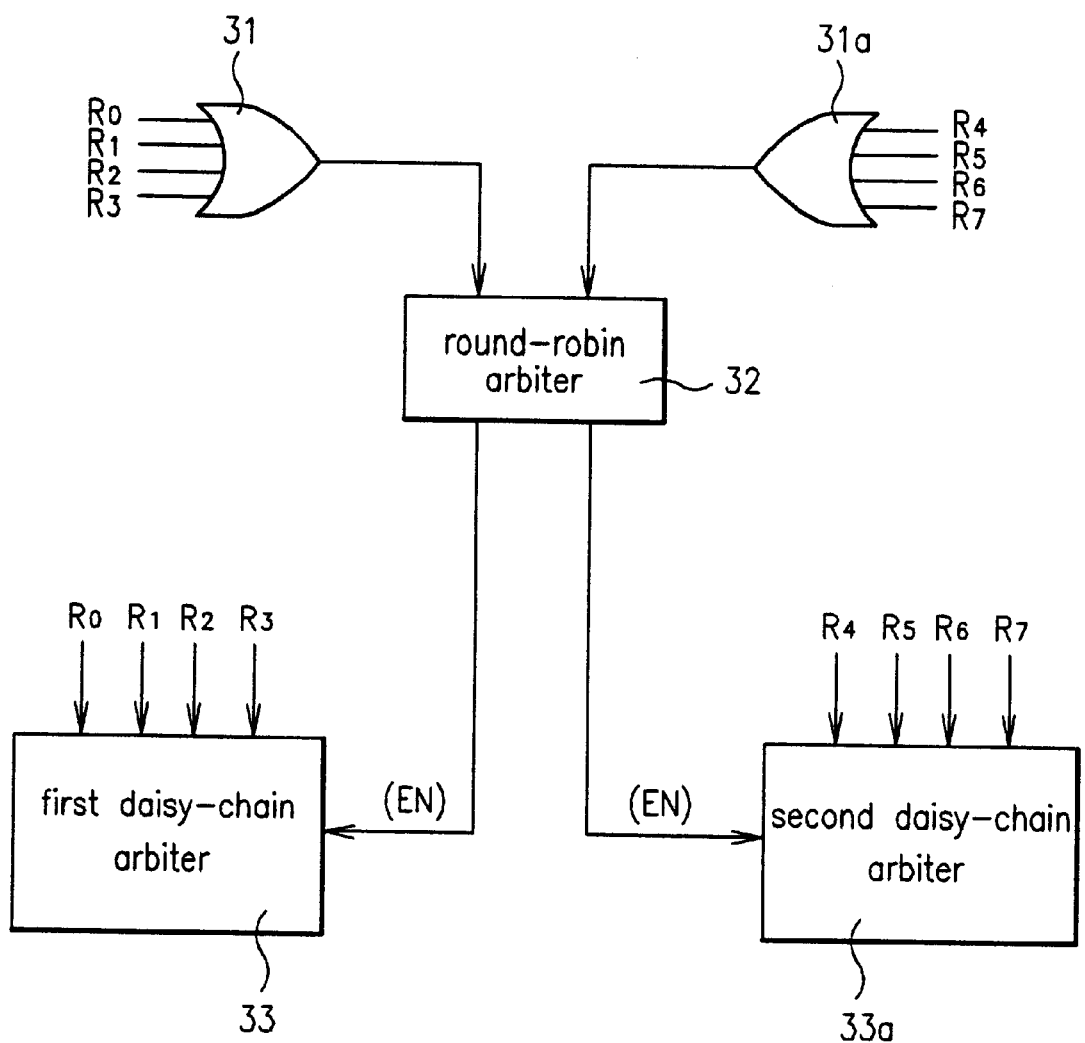
FIG. 3 is a schematic block of a bus arbitration system according to the first embodiment of the present invention.

FIG. 3 is a schematic block of a bus arbitration system according to the first embodiment of the present invention.

The bus arbitration system according to the first embodiment of the present invention adopts both round-robin mode and daisy-chain mode organically.

As illustrated in FIG. 3, the bus arbitration system includes first and second logic gates 31 and 31a, a round-robin arbiter 32, a first daisy-chain arbiter 33, and a second daisy-chain arbiter 33a.

A plurality of priority request signals are separately input to the first and second logic gates 31 and 31a. The priority request signals are then input to the round-robin arbiter 32 which determines the priority primarily. The first and second daisy-chain arbiters 33 and 33a are enabled by output signals of the round-robin arbiter 32 to determine the priority among the priority request signals secondarily.

Here, the first and second daisy-chain arbiters 33 and 33a are selectively enabled by the output signals from the round-robin arbiter 32. In addition, the daisy-chain arbiters may be replaced with dynamic daisy-chain arbiters.

The daisy-chain mode unilaterally determines the priority by sequential arrangement of devices in which the priority order has been determined. On the other hand, in the dynamic daisy-chain mode, an output terminal PO of the arbiter having the lowest priority order in daisy-chain is connected to an input terminal PI of the arbiter having the highest priority order. Therefore, in determining the current priority, the priority order is relatively determined by the position of the arbiter which has used the bus line most recently.

The operation of the bus arbitration system according to the first embodiment of the present invention as aforementioned will be described below.

The first embodiment of the present invention applies to the case that eight devices output the priority request signals respectively.

As illustrated in FIG. 3, the round-robin arbiter 32 primarily outputs the priority grant signal which determines which one of a plurality of the priority request signals input from the respective devices uses the bus line. In other words, the round-robin arbiter 32 outputs the priority grant signal among eight priority request signals input from the eight devices in order for any one of the devices to use the bus line. For example, in the case that the second device inputs the priority request signal R2 which desires to use the bus line, to the round-robin arbiter 32, the round-robin arbiter 32 checks whether the respective devices use the bus line and then determines the priority order in accordance with the round-robin mode so that the priority grant signal can be output. At this time, the priority grant signal which allows the priority for the second device to use the bus line, becomes an enable signal of the first daisy-chain arbiter 33.

Here, the enable signal (the priority grant signal which allows the priority for the second device to use the bus line) output from the round-robin arbiter 32 is identical to at least one signal of the eight priority request signals input to the first and second daisy-chain arbiters 33 and 33a. Thus, the arbiter is only enabled, to which the priority request signal R2 corresponding to the priority grant signal primarily determined by the round-robin arbiter 32 is input. In this case, the first daisy-chain arbiter 33 is enabled because it receives the priority request signal R2 from the second device.

The first daisy-chain arbiter 33 determines whether the other devices request the priority, in accordance with the daisy-chain mode, and then determines the priority, so as to finally output the priority grant signal.

Consequently, the priority order is determined primarily by the round-robin arbiter 32 and then determined secondarily by the first daisy-chain arbiter 33 or the second daisy-chain arbiter 33a to finally output the priority grant signal capable of using the bus line.

In the first embodiment of the present invention, the bus arbitration system includes eight priority request signal lines proportional to the number of the devices connected to the bus line. It is noted that the number of the priority request signal line depends on that of the device connected to the bus line. In this respect, the logic gates at input end of the round-robin arbiter 32 are formed as much as the number of the devices. In the same manner, the daisy-chain arbiters enabled by the round-robin arbiter 32 are formed as much as the number of the devices.

Figure 4:
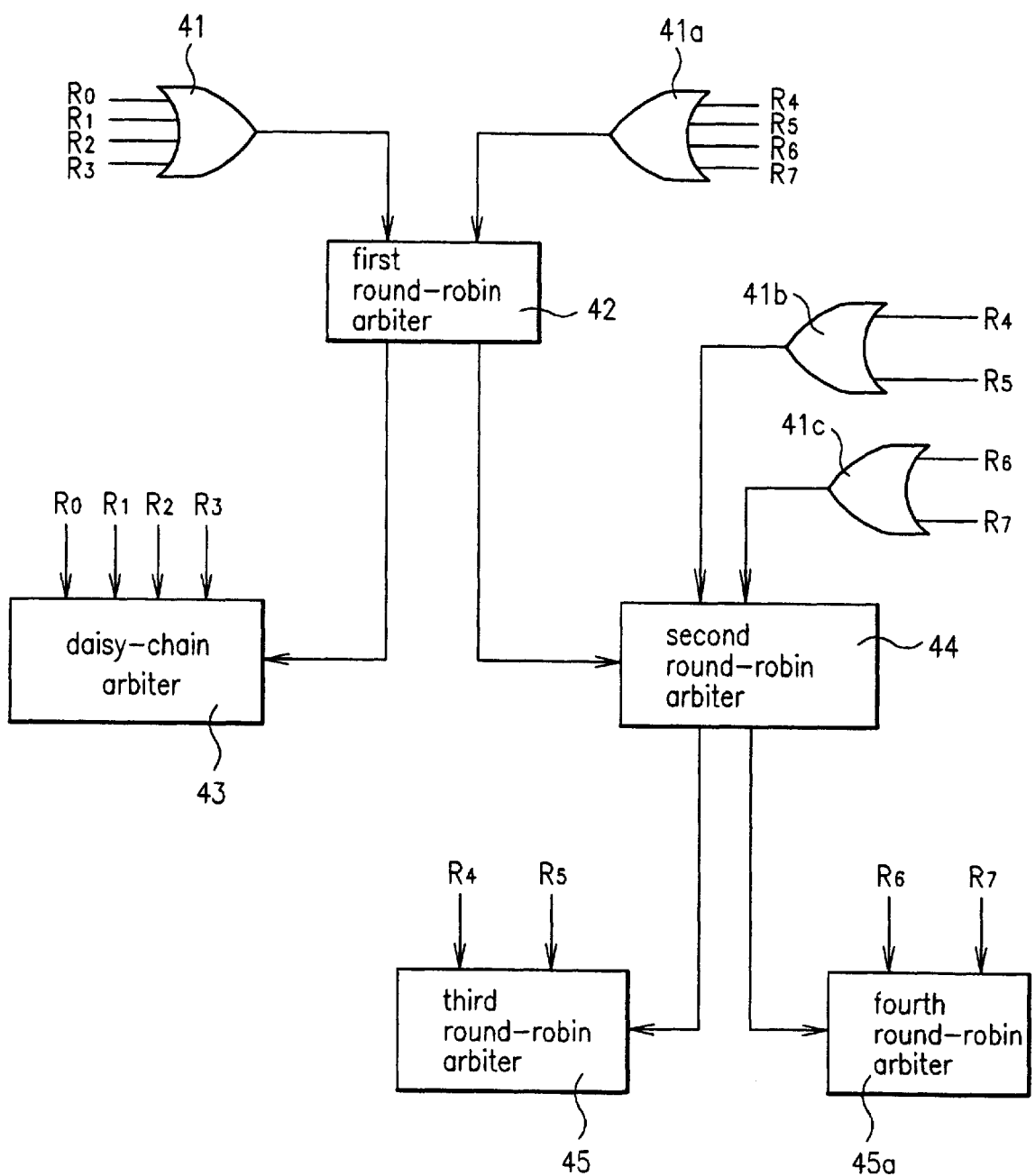
FIG. 4 is a schematic block of a bus arbitration system according to the second embodiment of the present invention.

FIG. 4 is a schematic block of a bus arbitration system according to the second embodiment of the present invention.

In the second embodiment of the present invention, the priority is determined by different levels as compared to the first embodiment in which the priority is determined by two levels.

As illustrated in FIG. 4, a hierarchical priority determination structure according to the bus arbitration system of the second embodiment includes a first round-robin arbiter 42, a daisy-chain arbiter 43, a second round-robin arbiter 44, a third round-robin arbiter 45 and a fourth round-robin arbiter 45a.

The daisy-chain arbiter 43 is driven by an enable signal of the first round-robin arbiter 42. The second round-robin arbiter 44 is also driven by an enable signal from the first round-robin arbiter 42. The third and fourth round-robin arbiters 45 and 45a are driven by enable signals from the second round-robin arbiter 44.

In this embodiment, the priority per the respective levels is determined so that a finally selected priority grant signal is output to the corresponding device.

The bus arbitration system according to the second embodiment of the present invention includes first and second logic gates 41 and 41a for separately inputting priority request signal lines, a first round-robin arbiter 42 for selectively outputting the priority grant signal primarily by inputting an output signal of the first and second logic gates 41 and 41a, a daisy-chain arbiter 43 for outputting the priority grant signal by determining the priority order of the priority request signals enabled by the priority grant signal from the first round-robin arbiter 42, a second round-robin arbiter 44 for secondarily outputting the priority grant signal of the priority request signals enabled by the priority grant signal from the first round-robin arbiter 42, and third and fourth round-robin arbiters 45 and 45a for outputting the final priority grant signal of the priority request signals enabled by the priority grant signal from the second round-robin arbiter 44.

Here, the final priority grant signal is output from any one of the daisy-chain arbiter 43, the third round-robin arbiter 45 or the fourth round-robin arbiter 45a.

The operation of the bus arbitration system according to the second embodiment of the present invention as aforementioned will be described below.

As illustrated in FIG. 4, eight priority request signal lines are separately input to the first and second logic gates 41 and 41a. That is, the priority request signal lines R0–R3 are connected to the first logic gate 41 and the priority request signal lines R4–R7 are connected to the second logic gate 41a.

The first round-robin arbiter 42 determines the priority primarily by inputting the output signals from the first and second logic gates 41 and 41a and then outputs the priority grant signal. In other words, the first priority order among the priority request signals is determined according to the round-robin mode and then the priority grant signal is output in order for the corresponding device to use the bus line.

At this time, even if the first round-robin arbiter 42 has output the priority grant signal, it is difficult for the corresponding device to use the bus line. The priority grant signal output from the successive arbiter at the next level allows the device to use the bus line. In other words, the first round-robin arbiter 42 outputs an enable signal to the successive arbiter for inputting the priority request signal corresponding to the device having the priority. For example, if the first round-robin arbiter 42 determines to allow the priority for the second device of the eight devices to use the bus line, the first round-robin arbiter 42 outputs the enable signal to the daisy-chain arbiter 43 for inputting the priority request signal from the second device.

Thus, the daisy-chain arbiter 43 is driven by the input enable signal and outputs the priority grant signal by determining the priority order of the input priority request signals R0–R3.

In the case that the first round-robin arbiter 42 allows the priority for the device to use the bus line, which outputs the priority request signal R6, the first round-robin arbiter 42 outputs the enable signal to the second round-robin arbiter 44 instead of the daisy-chain arbiter 43.

As a result, the second round-robin arbiter 44 enabled by the first round-robin arbiter 42 determines the priority order among the priority request signals R4–R7 input from the third and fourth logic gates 41b and 41c so as to output the priority grant signal secondarily.

At this time, the priority grant signal output from the second round-robin arbitration par 44 may be used as the enable signal of the third arbiter 45 or the fourth round-robin arbiter 45a. Here, the priority request signals R4 and R5 are input to the third round-robin arbiter 45 and the priority request signals R6 and R7 are input to the fourth round-robin arbiter 45a. In this respect, the second round-robin arbiter 44 outputs the enable signal to the fourth round-robin arbiter 45a. The fourth round-robin arbiter 45a is driven by the enable signal and outputs the priority grant signal which indicates which one of the devices uses the bus line.

In the second embodiment of the present invention, the bus arbitration system includes the eight priority request signal lines. It is, however, noted that the number of the priority request signal line depends on that of the device connected to the bus line.

In this respect, the bus arbitration system according to the second embodiment gives the priority grant signal to the corresponding device provided that the respective priority determined by the respective arbiters are identical to one another. Thus, such an system improves characteristics of the corresponding device which uses the bus line.

Figure 5:
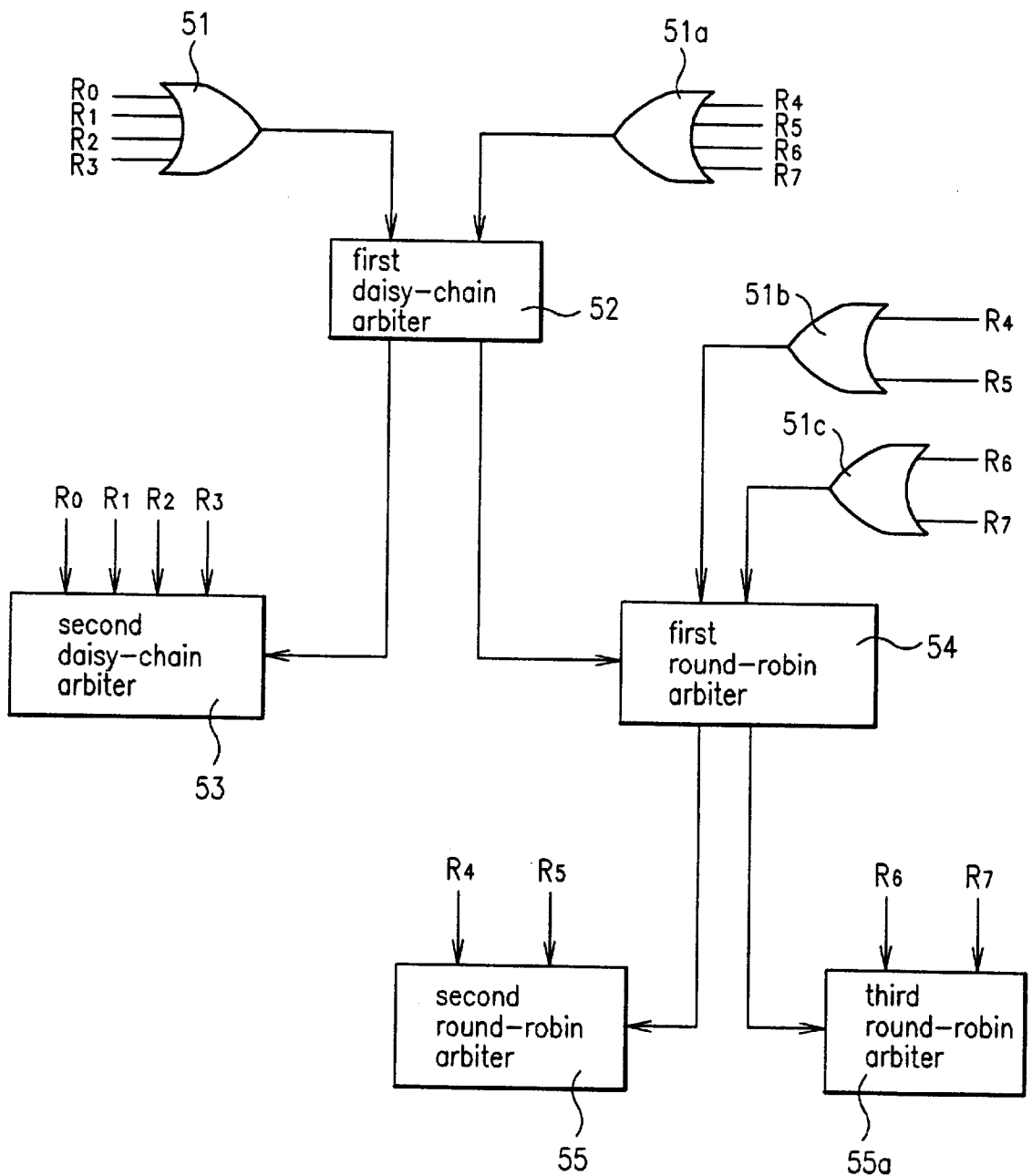
FIG. 5 is a schematic block of a bus arbitration system according to the third embodiment of the present invention.

FIG. 5 is a schematic block illustrating a bus arbitration system according to the third embodiment of the present invention.

In the third embodiment of the present invention, it intended that the priority grant signal is determined primarily by the daisy-chain arbiter.

Referring to FIG. 5, the bus arbitration system includes first and second logic gates 51 and 51a, a first daisy-chain arbitration part 52, a second daisy-chain arbiter 53, and second and third round-robin arbiters 55 and 55a.

The priority request signal lines are separately input to the first and second logic gates 51 and 51a. The first daisy-chain arbiter 52 selectively outputs the priority grant signal primarily by receiving the output signals from the first and second logic gates 51 and 51a. The second daisy-chain arbiter 53 outputs the priority grant signal by determining the priority order of the priority request signals enabled by the priority grant signal from the first daisy-chain arbiter 52. The first round-robin arbiter 54 outputs the priority grant signal secondarily by determining the priority order of the priority request signals enabled by the priority grant signal from the first daisy-chain arbiter 52. The second and third round-robin arbiters 55 and 55a finally output the priority signal enabled by the priority grant signal from the first round-robin arbiter 54.

To drive the second daisy-chain arbiter 53 and the first round-robin arbiter 54 which selectively receive the enable signal from the first daisy-chain arbiter 52, the priority request signals should be input to the second daisy-chain arbiter 53 and the first round-robin arbiter 54 through the corresponding device having the priority allowed in the first daisy-chain arbiter 52.

In other words, if the priority request signals corresponding to the device having the priority capable of using the bus line through the first daisy-chain arbiter 52 are input to the second daisy-chain arbiter 53, the first daisy-chain arbiter 52 outputs the enable signal to the second daisy-chain arbiter 53.

In the same manner, if the priority request signals corresponding to the device having the priority capable of using the bus line through the first daisy-chain arbiter 52 are input to the first round-robin arbiter 54, the first daisy-chain arbiter 52 outputs the enable signal to the first round-robin arbiter 54.

The operation of the bus arbitration system according to the third embodiment of the present invention will be described below.

As illustrated in FIG. 5, if the priority request signals from the eight devices connected to the bus line are input to the first daisy-chain arbiter 52 through the first and second logic gates 51 and 51a, the first daisy-chain arbiter 52 outputs the priority grant signal primarily using the daisy-chain mode.

The priority grant signal is used as the enable signal of the second daisy-chain arbiter 53 or the first round-robin arbiter 54. Here, either the second daisy-chain arbiter 53 or the first round-robin arbiter 54 is enabled depending on that the priority request signals corresponding to the device having the priority primarily through the first daisy-chain arbiter 52 are input to which one.

For example, as illustrated in FIG. 5, if the first daisy-chain arbiter 52 gives the priority capable of using the bus line to the device which outputs the priority request signal R2 of the eight priority request signals, the enable signal from the first daisy-chain arbiter 52 is input to the second daisy-chain arbiter 53.

In the third embodiment of the present invention, the priority request signals R0–R3 are input to the second daisy-chain arbiter 53 and the priority request signals R4–R7 are input to the first round-robin arbiter 54. Thus, the second daisy-chain arbiter 53 outputs the priority grant signal among the priority request signals R0–R3.

At this time, if the device having the priority through the first daisy-chain arbiter 52 outputs the priority request signal R6 among the eight priority request signals, the first daisy-chain arbiter 52 outputs the enable signal to the first round-robin arbiter 54.

As a result, the first round-robin arbiter 54 is driven to output the priority grant signal depending on the priority order for the priority request signals R4–R7 input from the third and fourth logic gates 41b and 41c.

The priority grant signal output from the first round-robin arbiter 54 is used as the enable signal of the second round-robin arbiter 55 or the third round-robin arbiter 55a. Here, the priority request signals R4 and R5 are input to the second round-robin arbiter 55, and the priority request signals R6 and R7 are input to the third round-robin arbiter 55a.

Therefore, the first round-robin arbiter 54 outputs the enable signal to the third round-robin arbiter 55a to which the priority request signal R6 is input.

The third round-robin arbiter 55a driven by the enable signal finally outputs the priority grant signal depending on the priority order for the priority request signals R6 and R7.

The final priority grant signal is output to the corresponding device. The device then uses the current bus line if it is not used after checking whether or not it is used.

As aforementioned, the bus arbitration system according to the present invention has the following advantages.

The bus arbitration system adopts both the daisy-chain arbitration mode and the round-robin arbitration mode organically. This allows the devices of different characteristics to use the bus line to be suitable for their characteristics, thereby improving throughput of the bus arbitration.

It will be apparent to those skilled in the art that various modifications and variations can be made in the bus arbitration system of the present invention without departing from the spirit or scope of the invention. Thus, it is intended that the present invention cover the modifications and variations of the invention provided they come within the scope of the appended claims and their equivalents.

What is claimed is:

1. A bus arbitration system comprising:
   a first priority grant signal determiner primarily determining a first priority grant signal among two groups including a plurality of priority request signals; and
   a second priority grant signal determiner finally outputting a second priority grant signal among the priority request signals, and enabled by the first priority grant signal from the first priority grant signal determiner,
   wherein the second priority grant signal determiner is of a different type than the first priority grant signal determiner.

2. The bus arbitration system as claimed in claim 1, further comprising a third priority grant signal determiner, a fourth priority grant signal determiner, . . . , an Nth priority grant signal determiner following the second priority grant signal determiner depending on the number of the priority request signals.

3. The bus arbitration system as claimed in claim 1, wherein the second priority grant signal determiner includes two daisy-chain arbiters or two round-robin arbiters.

4. A bus arbitration system comprising:
   a plurality of logic gates separately receiving a plurality of priority request signals and outputting a plurality of output signals by logic operation;
   a round-robin arbiter primarily outputting a priority grant signal among the plurality of output signals from the logic gates; and
   a plurality of daisy-chain arbiters finally outputting a final priority grant signal among the priority request signals and enabled by the priority grant signal from the round-robin arbiter.

5. The bus arbitration system as claimed in claim 4, wherein the round-robin arbiter outputs an enable signal to any one of a plurality of the daisy-chain arbiters.

6. The bus arbitration system as claimed in claim 4, wherein the round-robin arbiter may be replaced with a daisy-chain arbiter, and the daisy-chain arbiters may be replaced with round-robin arbiters.

7. A bus arbitration system comprising:
   a first round-robin arbiter primarily outputting a first priority grant signal among a plurality of priority request signals;
   a first daisy-chain arbiter and a second round-robin arbiter secondarily outputting second and third priority grant signals among the priority request signals and enabled by the first priority grant signal from the first round-robin arbiter; and
   third and fourth round-robin arbiters finally outputting fourth and fifth priority grant signals among the priority request signals and enabled by the third priority grant signal from the second round-robin arbiter.

8. The bus arbitration system as claimed in claim 7, wherein the third priority grant signal output from the second round-robin arbiter is output to either the third round-robin arbiter or the fourth round-robin arbiter as an enable signal.

9. The bus arbitration system as claimed in claim 7, wherein the first round-robin arbiter includes first and second logic gates for separately receiving a plurality of the priority request signals at their input ends.

10. The bus arbitration system as claimed in claim 9, wherein the second round-robin arbiter includes third and fourth logic gates for separately receiving a plurality of the priority request signals from the second logic gate.

11. The bus arbitration system as claimed in claim 10, wherein the third round-robin arbiter outputs the fourth priority grant signal among the priority request signals input to the third logic gate, and the fourth round-robin arbiter Outputs the fifth priority grant signal among the priority request signals input to the fourth logic gate.

12. The bus arbitration system as claimed in claim 9, wherein the first daisy-chain arbiter outputs the second priority grant signal among the priority request signals input to the first logic gate.

13. The bus arbitration system as claimed in claim 7, wherein the first round-robin arbiter outputs an enable signal to either the first daisy arbiter or the second round-robin arbiter.

14. A bus arbitration system comprising:
   first and second logic gates separately receiving a plurality of priority request signals and outputting respective output signals by logic operation;
   a first daisy-chain arbiter primarily outputting a first priority grant signal by receiving output signals from the first and second logic gates;
   a second daisy-chain arbiter and a first round-robin arbiter secondarily outputting second and third priority grant signals among the priority request signals and enabled by the first priority grant signal from the first daisy-chain arbiter; and
   second and third round-robin arbiters for finally outputting fourth and fifth priority grant signals among the priority request signals and enabled by the third priority grant signal from the first round-robin arbiter.

15. The bus arbitration system as claimed in claim 14, wherein the first round-robin arbiter outputs an enable signal to either the second round-robin arbiter or the third round-robin arbiter.

16. The bus arbitration system as claimed in claim 14, wherein the first daisy-chain arbiter outputs an enable signal to either the second daisy-chain arbiter or the first round-robin arbiter.

17. The bus arbitration system as claimed in claim 14, wherein the first round-robin arbiter includes third and fourth logic gates at its input end, which receive the priority request signals input to the second logic gate.

18. The bus arbitration system as claimed in claim 14, wherein the second daisy-chain arbiter outputs the second priority grant signal among the priority request signals input to the first logic gate.

19. A bus arbitration system comprising:
   a first level arbitration stage, including
      a plurality of logic gates receiving priority request signals and outputting a respective plurality of output signals, and
      a first level arbiter outputting a first priority grant signal obtained from the plurality of output signals, the first priority grant signal being outputted on one of a plurality of enable lines; and
   a second level arbitration stage, including
      a plurality second level arbiters respectively connected to the plurality of enable lines, at least one of the plurality second level arbiters being a different type of bus arbiter than the first level arbiter, and only one of the plurality second level arbiters being enabled by the first priority grant signal.

20. The bus arbitration system of claim 19, wherein only one of the plurality second level arbiters is a different type of bus arbiter than the first level arbiter.

21. The bus arbitration system of claim 19, wherein two of the plurality second level arbiters are a different type of bus arbiter than the first level arbiter.

* * * * *